3,471,587
FLUORINATED POLYPHENYLENE OXIDE POLYMERS AND BLENDS THEREOF WITH POLYARYLSULFONES
Charles A. Whittemore and Richard F. Heine, Roseville, Minn., assignors to Minnesota Mining and Manufacturing Company, St. Paul, Minn., a corporation of Delaware
No Drawing. Filed Mar. 8, 1967, Ser. No. 621,445
Int. Cl. C08g 23/16, 43/02
U.S. Cl. 260—823      12 Claims

ABSTRACT OF THE DISCLOSURE

Certain fluoroaliphatic-substituted poly-(phenylene oxides) which have utility as release coatings and as oil and water repellent coatings are disclosed. Also disclosed are blends of the fluoroaliphatic-substituted poly-(phenylene oxides) with polyarylsulfones. These blends are useful in the same general areas as the fluoroaliphatic-substituted poly-(phenylene oxides) but are normally harder and more heat resistant. They are of particular value as high temperature-resistant release coatings.

BRIEF SUMMARY OF THE INVENTION

This invention relates to novel and useful fluorine-containing polymeric compositions. In one aspect, the invention relates to fluoroaliphatic-substituted poly-(phenylene oxides). In another aspect, it relates to blends of the fluoroaliphatic-substituted poly-(phenylene oxides) with polyarylsulfones.

A major area of application of the polymers and blends of the invention is that of low surface energy coatings (which provide release surfaces and oil- and water-repellent surfaces). Such coatings have utility as mold release coatings, coatings for condensing surfaces (to promote efficient heat transfer by drop-wise condensation), antifouling coatings, bearing surfaces, etc. One particular area in which low adhesion coatings have gained considerable acceptance is in release coatings for cookware to permit the effortless and complete removal of foods cooked or baked in contact therewith. Although usually permitting easy removal of food, such coatings, often based on polytetrafluoroethylene, have not been fully satisfactory heretofore. They have been relatively soft and easily gouged or removed by abrasion or scraping, particularly at higher temperatures, and they have been easily stained and discolored. Furthermore, they have been difficult for the manufacturer to apply. Polytetrafluoroethylene cannot be applied as a liquid or from a solution but must be applied as a finely divided solid and sintered in place. The temperatures required for this are so high that the metal to which it is applied, e.g. aluminum, is frequently softened and warped.

The present invention overcomes or greatly reduces these problems. The polymers and blends of the present invention are easily applied from solutions or dispersions in organic solvents and form continuous coatings upon evaporation of the solvent and application of a moderate (but not unduly high) baking cycle. The blends of the invention provide low energy coatings of greatly improved hardness, low coefficient of friction, abrasion resistance, appearance and resistance to staining, even at the high temperatures encountered in cooking and baking. The fluoroaliphatic-substituted poly-(phenylene oxides) of the invention also form valuable low-adhesion coatings but do not generally have the hardness and heat resistance of the blends. The above and other properties of the compositions of the invention extend of course to areas of use other than release coatings, e.g. they can be used as molded articles, films, etc.

It is an object of the invention to provide novel fluoroaliphatic-substituted poly-(phenylene oxides). It is another object of the invention to provide blends of the fluoroaliphatic-substituted poly-(phenylene oxides) with polyarylsulfones. It is another object of the invention to provide low adhesion surface coatings comprising fluoroaliphatic-substituted poly-(phenylene oxides). It is another object of the invention to provide low adhesion surface coatings comprising blends of fluoroaliphatic-substituted poly-(phenylene oxides) with polyarylsulfones. It is a further object of the invention to provide films of fluoroaliphatic-substituted poly-(phenylene oxides). It is a further object of the invention to provide films of blends of fluoroaliphatic-substituted poly-(phenylene oxides) with polyarylsulfones. It is a further object of the invention to provide molded articles comprising fluoroaliphatic-substituted poly-(phenylene oxides). It is a further object of the invention to provide molded articles comprising blends of fluoroaliphatic-substituted poly-(phenylene oxides) with polyarylsulfones. It is a further object of the invention to provide dispersions of blends of fluoroaliphatic-substituted poly-(phenylene oxides) and polyarylsulfones in organic solvent media. It is a still further object of the invention to provide a process for the preparation of fluoroaliphatic-substituted poly-(phenylene oxides). Still other objects will become apparent to those skilled in the art upon reading this specification.

DETAILED DESCRIPTION

The fluoroaliphatic-substituted poly-(phenylene oxides) of the invention are thermoplastic and from about 20 to 65 percent of the weight thereof is contributed by fluorine atoms in fluoroaliphatic side groups which occur as substituents on the aromatic nuclei therein. Preferably these polymers are linear or substantially linear, have an inherent viscosity measured from a 1% solution of the polymer in chloroform of at least 0.05 and a number average molecular weight of at least 1500. More preferably the inherent viscosity of these polymers is above 0.1 and their number average molecular weight is above about 2000.

Ordinarily, the fluoroaliphatic side groups contain not more than about 14 carbon atoms, a terminal $CF_3$ group in each being sufficient to render the polymer hydrophobic. Polymers containing fluoroaliphatic groups with from 3 to 14 carbon atoms are of particular interest since they have low energy, oleophobic and hydrophobic surfaces. Fluorinated side chains containing more than 14 carbon atoms ordinarily have no better low energy and oleophobic/hydrophobic surface characteristics but are increasingly expensive and hence are not preferred.

The fluoroaliphatic side groups are preferably perfluoroaliphatic although efficient operation can be obtained from fluoroaliphatic side groups wherein a small fraction, e.g. less than about 25 percent of the fluorine atoms thereof have been replaced by atoms of hydrogen or chlorine, provided that a $CF_3$ terminal group is present in the radical. The term fluoroaliphatic as used herein includes open chain, linear or branched as well as alicyclic radicals and radicals containing a carbon linking heteroatom in the skeletal chain such as oxygen or nitrogen. Inclusion of an oxygen atom linking two fluorinated carbon atoms or a nitrogen atom linking three fluorinated carbon atoms does not materially alter the properties of the aliphatic radical. Straight chain structures are generally preferred, although alicyclic rings or branched chain structures are also effective. Mixtures of various structures or chain lengths are commonly used since they are more readily commercially available and generally tend to provide improved release properties.

The fluorinated polymers are prepared by reaction of a poly-(phenylene oxide) with a fluoroaliphatic halide, i.e. a fluoroaliphatic sulfonyl chloride or bromide (preferably a sulfonyl chloride) or a fluoroaliphatic iodide. The reaction is carried out by adding the appropriate fluoroaliphatic halide to a solution of the polymer in an inert solvent, such as dichlorobenzene, and heating to approximately 170° C. or above until reaction is complete. A metal salt (such as cuprous chloride) with or without pyridine or a free radical-generating substance, such as a peroxide, or ultraviolet light can be added as a catalyst although the reaction is sometimes run using thermal activation alone. Byproducts of the reaction include the hydrogen halide and, when the fluorinated reactant is a sulfonyl chloride or bromide, sulfur dioxide as well. The degree of substitution and the fluorine content of the final polymer are determined by the nature and amount of the polyfluoroaliphatic halide used.

Ordinarily (but not necessarily) the poly-(phenylene oxide) precursors of the polymers of the invention contain a total of at least about 80 percent para- and orthophenylene oxide units, the remainder, if any, being made up by meta-phenylene oxide units. These polymers can be either crystalline or amorphous in nature and can be further selected to have relatively high melting points or relatively lower softening ranges.

A preferred class of the fluorinated polymers of the invention contain not less than 80 percent para- nor more than 15 percent ortho-phenylene oxide units with the remainder, if any, consisting of meta-phenylene oxide units. They are prepared from highly crystalline poly-(phenylene oxides) which normally have (1) melting points of from 220 to 295° C. as determined by DTA (differential thermal analysis), (2) inherent viscosities measured as 1 percent solutions of polymer in concentrated sulfuric acid (98% assay) of at least 0.3 and (3) substantially complete solubility in diphenyl ether at 225° C. in the ratio of 5 parts by weight of polymer to 95 parts solvent. They (the precursors) are normally of high molecular weight and can be formed into films which have tensile strengths of at least 5000 p.s.i. in unoriented state and which can be stretched biaxially to at least four times their original areas. Particularly useful polymers of the invention contain all para-phenylene oxide units and are prepared from poly-(para-phenylene oxide) melting from about 285 to 295° C. as determined by DTA. The DTA test is discussed in Chapter IX in "Newer Methods of Polymer Characterization" edited by Bacon Ke and published by Interscience, New York, 1964.

Another useful class of the fluorinated polymers of the invention are those which contain from 30 to 75 mole percent of para-phenylene oxide units with the remainder being ortho-phenylene oxide units. They are prepared from poly-(phenylene oxides) containing the same relative amounts of para- and ortho-units which are amorphous and normally have (1) softening ranges below 150° C. as determined by DTA, (2) inherent viscosities measured as 1 percent solutions of polymer in concentrated sulfuric acid of at least 0.3 and (3) substantially complete solubility in benzene at 25° C. A particularly preferred subclass of the fluorinated polymers of this type contains about 35–40% ortho-phenylene oxide units, the remainder being para-phenylene oxide units. Poly-(phenylene oxides) of other types than those listed are also suitable precursors for the polymers of the invention.

The highly crystalline poly-(phenylene oxides) of the type described above can be prepared from alkali metal halo-phenolate monomers utilizing the process disclosed in British Patent No. 1,053,053. Other suitable poly-(phenylene oxide) precursors (including the amorphous polymers of the type just described) can be prepared in essentially the same way by simply varying the relative amounts of the ortho-, meta- and para-alkali metal halo-phenolates.

The fluoroaliphatic-substituted poly-(phenylene oxides) of the invention prepared from the two classes of precursors just described contain respectively (1) not less than 80 percent para- nor more than 15 percent ortho-phenylene oxide units with the remainder being made up by meta-phenylene oxide units and (2) from 30 to 75 percent para-phenylene oxide units with the remainder being ortho-phenylene oxide units. These form two preferred subclasses of the polymers of the invention.

Among the fluoroaliphatic halides useful in preparing the polymers of the present invention are straight and branched chain and cyclic perfluoroalkanesulfonyl halides, for example, perfluoropropanesulfonyl bromide, perfluorobutanesulfonyl chloride, perfluorohexanesulfonyl bromide, perfluoro (4-ethylcyclohexane)sulfonyl chloride, perfluoro- (2-ethylhexane)sulfonyl chloride, perfluorooctanesulfonyl bromide, perfluorodecanesulfonyl chloride, perfluorododecanesulfonyl bromide, etc., polyfluoroaliphatic sulfonyl halides such as β-chloroperfluorooctanesulfonyl chloride and perfluoroaliphatic and polyfluoroaliphatic iodides such as $C_7F_{15}I$, $C_2F_5OCF_2CF_2I$, $CF_3CF_2CF_2CF_2CH_2I$, $CF_3(CF_2Cl)CFC_4F_8I$ and $CF_3(CF_2H)CFC_4F_8I$.

The blends of the invention contain from about 2 to 50 parts by weight of fluoroaliphatic-substituted poly-(phenylene oxide) and from about 98 to 50 parts by weight of a thermoplastic substantially linear polyarylsulfone. From about 1 to 25 (preferably from about 1 to 15) weight percent of the blend is contributed by fluorine atoms in the fluoroaliphatic groups. Normally, these blends are physical mixtures of the precursor polymers which, when dried (i.e. when the solvent is removed therefrom) form two phases.

Polyarylsulfones useful in preparing the blends of the invention are thermomplastic, substantially linear and soluble and preferably have recurring aromatic sulfone units in the main chains thereof of the formula $$\{SO_2—Z\}$$

wherein Z is an organic group containing not more than about 30 carbon atoms which is aromatically bonded to both of its valences. More preferably Z contains not more than about 18 carbon atoms. The preparation of the polyarylsulfones will be discussed hereinafter.

The blends of the invention are conveniently applied to surfaces to be coated from solvent dispersion (solution or suspension). These dispersions are prepared by mixing a solution of the polyarylsulfone (PArS) in a liquid amide which is free of active amide hydrogen (such as dimethylformamide, dimethylacetamide or N-methyl pyrrolidone) with a solution of the fluoroaliphatic-substituted poly-(phenylene oxide) ($R_fPPO$) in an aromatic hydrocarbon solvent (such as xylene or toluene) with good stirring.

The ratio of the two types of solvent in the blend dispersions are generally kept within the range of about 80±6 parts (by weight) of the amide solvent and 20±2 parts of the aromatic solvent since the PArS will coagulate if too much aromatic solvent is used and the $R_fPPO$ is insoluble in the amide solvent. An overall solids content of about 20 percent in the blend dispersions is usually satisfactory, although this can be varied. Even at these proportions, some of the polymer may separate necessitating stirring of the dispersion before use.

The polymers of the invention (i.e. the fluoroaliphatic-substituted poly-(phenylene oxides)) can be handled as solutions or dispersions in liquids, e.g. aromatic solvents, such as xylene or toluene, or in solid form, e.g. using hot melt techniques.

When the polymers or blends of the invention are to be applied as coatings, care should be taken to insure that the substrate is clean before application to insure good adhesion. Some surface preparation is usually indicated, e.g. degreasing, then grit blasting or sanding or chemically milling or priming. The polymers or blends, preferably as solutions or solvent dispersions, can be applied by spraying, roll coating, brushing, etc. or by dipping the article to be coated therein or by other known methods, and dried. A drying cycle of 15 minutes at from 100 to 200° C. and then a bake of 5 to 10 minutes at from about 260 to 325° C. is generally satisfactory.

Often it is desirable to utilize various adjuvants with the polymers and blends. Thus various fillers, such as calcium carbonate, iron oxide, titanium dioxide, fuller's earth, quartz flour, asbestos, glass filaments, glass beads, color pigments, conductive materials such as carbon or metal powders, etc. can be mixed with them. Other fluorine-free or fluorine-containing polymers, plasticizers, colorants, resins and the like may also be added.

As indicated previously, the polymers and blends of the invention have a wide variety of uses. They can be used to coat or treat fibrous, porous and other types of substrates including wood, paper, textile fabrics, asbestos, ceramics, glass, metals (such as aluminum, brass, steel, iron, copper, tin and nickel) etc. They are strong and tough and adhere tenaciously to these and other substrates, yet have extremely low surface energy properties. They can also be used as adhesives, impregnants, and in laminants (e.g. with glass fibers or cloth). The blends are generally harder and more resistant to high temperatures than the polymers and are thus of particular value in high temperature coating applications (such as release coatings for cookware, molds, ovens and the like).

The following is a description of the preparation of polyarylsulfones suitable for use in preparing the blends of the invention. These polyarylsulfones are prepared by heating in the presence of a catalytic amount of an anhydrous Lewis acid at least one compound of the formula $$(H)_xZ(SO_2X)_y$$

wherein (H) is a sulfonatable hydrogen atom, $(SO_2X)$ is a reactive sulfonyl halide group, $x$ and $y$ are each 0–2, the sum of $x$ and $y$ being 1–2 and Z is an aromatic structure. The sum of $x$ and $y$ in any chain extending compound (monomer) is 2, and the sum of $x$ and $y$ in any chain terminating compound is 1. In these precursor compounds (H) and/or $(SO_2X)$ are bonded to Z through aromatic rings therein which are free of hetero nitrogen atoms. Z preferably contains not more than about 18 carbon atoms, and is preferably entirely aromatic.

The linear polyarylsulfone polymers are formed by dehydrohalogenative condensation reactions between the (H) and $(SO_2X)$ groups. The total valence of Z in any precursor compound is equal to the sum of $x$ and $y$ for that compound. The $(SO_2X)$ groups are sulfonyl chloride or sulfonyl bromide, preferably sulfonyl chloride. A large variety of monomers can be used in their preparation. The reason for this appears to be a deactivating effect of the sulfonyl group on the aromatic ring to which it is or becomes attached. This deactivation is sufficient to prevent any significant amount of higher than monosulfone formation in any one ring. Branching and crosslinking are thus suppressed. The amounts of the difunctional chain extending monomers charged must be such as to balance stoichiometrically the (H) and $(SO_2X)$ groups in order to obtain relatively long chain polymers.

The following are exemplary of suitable precursor compounds. Compounds of the type $(H)_2Z$: biphenyl, naphthalene, anthracene, diphenylmethane, diphenyl ether, diphenyl sulfide, compounds of the formula

wherein Y is a member of the group consists of —O—, —S— and a carbon-carbon valence bond and W is a member of the group consisting of —O—, —S— and —CH$_2$—, such as dibenzofuran, fluorene, xanthene, dibenzothiophene, dibenzo-1,4-thioxane and the like. Compounds of the type $(H)_1R(SO_2X)_1$: p-diphenyl ether monosulfonyl chloride, naphthylphenyl ether monosulfonyl chloride, p-biphenyl monosulfonyl chloride, 2-fluorene sulfonyl chloride, 2-dibenzofuran sulfonyl chloride and 2-naphthalene sulfonyl chloride. Compounds of the type $R(SO_2X)_2$: p,p'-diphenyl ether disulfonyl chloride, p,p'-diphenyl methane disulfonyl chloride, p,p'-biphenyl disulfonyl chloride, 2,7-fluorene disulfonyl chloride, 2,8-dibenzofuran disulfonyl chloride, 2,7-naphthalene disulfonyl chloride and p,p'-diphenylsulfide disulfonyl chloride.

A preferred class of polyarylsulfones is made up of those which consist essentially of divalent biphenyl and diphenyl ether moieties connected by sulfone groups in which the ratio of diphenyl ether to biphenyl moieties ranges from 4:6 to 3:7.

The preparation of the linear polyarylsulfones, broadly speaking, is carried out in either a melt or a solution and ordinarily at a temperature ranging from 100 to 200° C. in the presence of a condensation catalyst, e.g. anhydrous Lewis acids (or Friedel-Crafts catalysts) such as ferric chloride, antimony pentachloride, molybdenum pentachloride, indium trichloride, gallium trichloride, etc. Anhydrous hydrogen fluoride or trifluoromethane sulfonic acid also may be used as catalysts. The particularly preferred catalysts are the halides of iron and indium. The catalysts are generally used in amount of from 0.05 to about 0.5 mole percent, based on the amount of monomer present.

It is generally preferred to utilize an inert solvent in carrying out the polymerization process in order to increase the fluidity of the reaction mixture. The preferred solvents are chlorinated aliphatic and aromatic hydrocarbons boiling above 100° C. at atmosphere pressure, e.g. s-tetrachloroethane, methylene chloride, and Aroclors (highly chlorinated biphenyl and diphenyl ether), etc. or aliphatic and aromatic sulfones such as dimethyl sulfone, tetramethylene sulfone, p,p'-dichlorodiphenyl sulfone, etc., or aliphatic and aromatic nitro compounds, such as n-nitropropane, nitrobenzene, 2,3'-dichloronitrobenzene, etc. The particularly preferred solvents are nitrobenzene and the chloronitrobenzenes.

To effect the polycondensation, the monomers or comonomers are generally first heated in the presence of the inert solvent to a temperature sufficient to obtain a uniform reaction mixture after which the catalyst is added. The mixture is then maintained at a temperature in the range of from 100° to 200° C. for from about one to twenty hours, to complete the polymerization.

The following examples illustrate more specifically the preferred embodiments of the invention but are not to be construed as limiting thereof. Unless otherwise specifically indicated, the following apply in the examples: All parts are by weight and the melting points are determined by DTA (differential thermal analysis). The inherent viscosities of the poly-(phenylene oxides) in sulfuric acid are determined at 25° C. using a 1% solution of the polymer in concentrated sulfuric acid, said solution being prepared by heating the polymer and acid together, e.g. for 30 minutes at about 150° C. is ordinarily sufficient. The inherent viscosities in chloroform are also determined as 1% solutions.

The fluoroaliphatic-substituted poly-(phenylene oxides) of Examples 1–6 each have an inherent viscosity (at 25° C.) measured from a 1% solution of the polymer in chloroform of at least 0.05 and a number average molecular weight of at least 1500.

THE FLUOROALIPHATIC-SUBSTITUTED POLY-(PHENYLENE OXIDES)

Example 1

A copolymer of 36% ortho- and 64% para-copoly-(o,p-phenylene oxide) was prepared as follows, utilizing potassium p- and potassium o-chlorophenolate monomers prepared according to the teachings of British Patent 1,053,053:

Potassium o-chlorophenolate (610.2 g., 3.665 moles) was charged from a storage vessel through thin walled rubber tubing into a 3 l. stainless steel autoclave previously dried and purged with nitrogen at 200° C. Potassium p-chlorophenolate (1416 g., 6.450 moles) was then introduced in the same manner. Finally, 0.950 g. (0.096 mole) of purified cuprous chloride was added and the addition assembly was replaced by the head of the autoclave. The autoclave was then evacuated for several hours, filled with nitrogen, sealed and placed in a rocking heater where it was held 14 hours at 180° C. and then 5½ hours at 250° C. (3 hours being required to attain each temperature level). The autoclave was then cooled to 100° C. and 1 l. of methylene chloride was added to the charge which was rinsed out of the autoclave with an additional liter of methylene chloride. The polymer solution was added slowly to 5 gallons methanol which was being stirred with a Cowles Dissolver and the resulting solid was filtered, stirred with 4 N HCl and washed alternatively with water and methanol (two times) and dried under high vacuum. The yield of tan polymer was 896 g. (96.4%). Its inherent viscosity in $CHCl_3$ was 0.268 and in $H_2SO_4$ was 0.518. This polymer had a softening range below 150° C. and was soluble in benzene.

A 7.4 gram sample of this copolymer (which contained about 36% ortho and 64% para-phenylene oxide units) was dissolved in 190 milliliters of o-dichlorobenzene in a 250 milliliter flask. 25.9 grams (0.05 mole) of perfluorooctanesulfonylchloride was added and the mixture was refluxed for 20.5 hours. The more volatile materials were then removed to leave approximately 50 milliliters of solution which was then poured into methanol and slurried in a Waring Blendor, filtered and dried to give 11.5 grams of a light tan material. This material, upon analysis, showed strong C–F absorption in the infrared and was found to contain 29.5% of fluorine. It had a number average molecular weight ($M_n$) of 2450 and an inherent viscosity in $CHCl_3$ of 0.124. A film of this polymer was solvent cast from chloroform and cured at 250° C. It was found to have a contact angle (hexadecane) of 56.2°.

A 25% dispersion of equal parts of the foregoing fluorocarbon-substituted poly-(phenylene oxide) with titanium dioxide in an aromatic solvent was prepared and sprayed onto aluminum plates, dried at 120° C. and given a final bake at about 285° C. for about ½ hour. The resulting coating was heated to remove the solvent and tested to determine its release properties after frying an egg thereon at approximately 180° C. A suspension of poly-(p-phenylene oxide) prepared according to the teachings of British Patent 1,053,053 was prepared and tested in the same way to provide a control. The results were as follows:

| Formulation | Contact angle (hexadecane) (deg.) | Release properties of coating after frying an egg thereon at approximately 180° C. |
|---|---|---|
| 50% R₁PPO, 50% TiO₂ | 44 | Released very well. |
| 50% poly-(p-phenylene oxide), 50% TiO₂ | 0 | Considerable sticking. |

Example 2

A 92.1 gram sample of copoly-(o,p-phenylene oxide) was dissolved in 700 milliliters of o-dichlorobenzene. This copolymer, which contained 37.7% ortho- and 62.3 paraphenylene oxide units was prepared utilizing the process set out in Example 1 but with a slightly different proportion of monomers. The solution was heated to 170° C. and a 518.6 gram (1.0 mole) portion of perfluorooctanesulfonylchloride was added drop-wise over a 15 hour period. The reaction mixture was allowed to cool, then quenched in methanol, slurried in a Waring Blendor, filtered, washed with methanol and dried in vacuo overnight at 50° C. The yield was 275.4 grams of a light tan product, $M_n$ 3500, inherent viscosity ($CHCl_3$) 0.126. The infrared spectrum showed strong C–F absorption. The polymer contained 43.6% fluorine. TGA (thermal gravimetric analysis) showed a 10% weight loss at 330° C. and a 50% weight loss at 534° C. (at a heating rate of 5° C. per minute). A film cast from chloroform on a steel bar and cured for one hour at 315° C. had a critical surface tension of 16.2 dynes per centimeter, and a contact angle in hexadecane of 52°.

Example 3

A 31 gram sample of the copoly-(o,p-phenylene oxide) used in Example 2 was dissolved in 235 milliliters of 1,2,4-trichlorobenzene. The mixture was heated to 170° C. and a 112 gram (0.22 mole) portion of perfluorooctanesulfonylchloride was added drop-wise beneath the surface of the solution over a 6 hour period. The mixture was allowed to cool and the product was quenched in methanol in a Waring Blendor, washed with methanol and dried overnight in vacuo at 50° C. to yield 72.9 grams of a light tan polymer having a fluorine content of 46.0 percent. The yield was about 60%.

Example 4

A 50 gram sample of poly-(p-phenylene oxide) prepared according to the process of Example 4 of British Patent 1,053,053 was dissolved in 800 milliliters of 1,2,4-trichlorobenzene at 200° C. The solution was cooled to 180° C. and a 311.5 gram (0.6 mole) portion of perfluorooctanesulfonylchloride was added drop-wise over an 11 hour period. The reaction mixture was allowed to cool. A very viscous oil separated. This oil (part O) and the soluble portion (part S) were worked up separately by quenching in methanol in a Waring Blendor, filtering and drying overnight in vacuo at 50° C. The yield was 101.6 grams of a tan polymer. The infrared spectra for both parts show strong C–F absorption. The TGA of part O shows a 10% weight loss at 384° C. (heating rate of 5° C. per minute). A film cast from chloroform on a steel bar and dried at about 315° C. for one hour had a contact angle of 58° (with hexadecane). Other measurements on these polymers were as follows:

| | Part O | Part S |
|---|---|---|
| Molecular Weight ($M_n$) | 3,900 | 4,800 |
| Fluorine content, percent | 41.7 | 36.9 |
| Inherent viscosity (CHCl₃) | 0.065 | 0.052 |

Example 5

A 10 gram sample of poly-(p-phenylene oxide) was dissolved in 138 milliliters of 1,2,4-trichlorobenzene at 200° C. A 62.3 gram (0.12 mole) portion of perfluorooctanesulfonyl chloride was added drop-wise beneath the surface of the solution over a three hour period. The reaction mixture was cooled and quenched with methanol in a Waring Blendor. The polymer was washed with methanol in the blender and dried in vacuo at 80° C. overnight to give 14.6 grams of light tan polymer. Elemental analysis showed a fluorine content of 25.1%.

Example 6

Poly-(phenylene oxide) (93 grams) was dissolved in dichlorobenzene in a 3 neck 500 ml. flask equipped with a stirrer, Dean-Stark trap, condenser and dropping funnel. The polymer was a copolymer of 37.7% ortho- and 62.3% para-copoly-(o,p-phenylene oxide) (prepared in Example 2). Perfluorooctanesulfonyl chloride, 500 g., was added slowly to the stirred solution at 170° C. An azeotrope of dichlorobenzene and byproduct perfluorooctylchloride was collected in the Dean-Stark trap. Gas evolution was observed by means of a bubble trap attached to the exit side of the condenser. After all of the sulfonyl chloride was added and the gas evolution ceased, the solution was cooled. The polymer was coagulated by addition to methanol in a Waring Blendor. A finely divided brown solid was obtained which was washed once with methanol in the blender to leave a product having a fluorine analysis of 36.8% and an inherent viscosity in CHCl₃ of 0.175.

THE BLENDS

Example 7

A polyarylsulfone consisting essentially of divalent biphenyl and diphenyl ether moieties connected by sulfone groups, of which the ratio of diphenyl ether to biphenyl moieties was 1:2, was prepared as follows:

A glass-lined reactor equipped with a high viscosity agitator and a temperature control system was charged with 93.6 parts of diphenyl ether disulfonyl chloride, 63.8 parts of biphenyl monosulfonyl chloride, 38.55 parts of biphenyl and 247.6 parts of nitrobenzene. The solids content at this point was 40 percent. The reactor contents were heated to about 100° C. and 1 part of indium trichloride was then added. The reactor temperature was thereafter raised to about 130° C. over a period of about 1 hour with agitation and maintained at this temperature. The evolved HCl was trapped by means of a water scrubber. As the viscosity of the reacting mass increased, the speed of the agitator was progressively reduced from 60 r.p.m. to 20 r.p.m. and solvent was added from time to time. After a total reaction time of about 56 hours, the batch had been diluted to about 17% solids by additions of nitrobenzene and N,N-dimethylformamide. The polymer was precipitated by continuously adding the polymer solution to a bath of methanol with high shear agitation. The solvents were decanted from the solids, which were then washed (successively in hot methanol, hot 50/50 methanol-acetone, dilute HCl in water and plain water), filtered and dried.

A blend according to the invention (R$_f$PPO–PArS) was prepared as follows: Polyarylsulfone of the type just described (ratio of diphenyl ether to biphenyl moieties of 1:2) having an inherent viscosity of .40 measured as a 1% solution of polymer in dimethyl formamide at 25° C. was dissolved in N-methyl pyrrolidone to make a 20% (by weight) solution. Another solution was prepared by dissolving the perfluoroaliphatic-substituted poly-(phenylene oxide) of Example 6, in xylene to give a 20% solution. The two solutions were mixed with agitation in a ratio of 4 parts of the sulfone solution to 1 part of the R$_f$PPO solution.

Example 8

Six different polymers were coated onto unprimed polished aluminum panels as follows:

Poly-(phenylene oxide).—A solution of the starting polymer of Example 6 in dichlorobenzene was sprayed onto the panels, air dried at 120° C. and baked at 315° C. for about ½ hour.

Polyarylsulfone.—A solution of the polymer of Example 7 in N-methyl pyrrolidone was sprayed onto the panels, air dried at 120° C. and baked at 315° C. for about 10 minutes.

R$_f$PPO.—A solution of the polymeric product of Example 6 in xylene was sprayed onto the panels, air dried at 120° C. and baked at 315° C. for about ½ hour.

R$_f$PPO–PPO.—A blend of 4 parts of a 20% solution of the starting polymer of Example 6 (PPO) in dichlorobenzene and 1 part of a 20% solution of the polymeric product of Example 6 (R$_f$PPO) in xylene was sprayed onto the panels, air dried at 120° C. and baked at 315° C. for about ½ hour.

R$_f$PPO–PArS.—The blend described in Example 7 was sprayed onto the panels, air dried at 120° C. and baked at about 315° C. for about 10 minutes.

Polytetrafluoroethylene.—The panels were prime coated with a 25% polytetrafluoroethylene dispersion containing also about 25% by weight of a soluble hexavalent chromium salt and dried. An aqueous 25% suspension of the polymer was then sprayed onto the panels, dried at 120° C. and baked at 370° C. for 30 minutes.

The results of tests run on these panels are summarized in the following table.

| | Surface energy (dynes per cm.)[1] | Kinetic coefficient of friction[2] | Abrasion loss in mg./1,000 cycles[3] | Hardness, pencil[4] |
|---|---|---|---|---|
| Poly-(phenylene oxide) | 24.7 | 0.17 | 4 | 2H |
| Polyarylsulfone | 24.5 | 0.15 | 1 | 4H |
| R$_f$PPO | 17.0 | 0.09 | 55 | H |
| R$_f$PPO–PPO | 16.8 | 0.13 | 30 | H |
| R$_f$PPO–PArS | 16.5 | 0.12 | 3 | 2H |
| Polytetrafluoroethylene | 18.5 | 0.07 | 4 | <H |

[1] Test described by W. A. Zisman in "Contact Angle, Wettability and Adhesion," ACS Advances in Chemistry Series.
[2] Coefficient of friction determined using a 1.24 pound weight on a polished stainless steel slide (having a 2 square inch base) pulled at 0.5 inch per minute across the film.
[3] Run on a Taber Abrader, CS-10 wheels, 500 g. load.
[4] Pencil hardness was measured in the standard manner using drawing pencils, as described in Gardner-Sward, "Paint Testing Manual," Twelfth Edition, 1962, Gardner Labs, p. 131.

Thus, it is noted that the R$_f$PPO–PArS blend of the present invention can be applied and baked at a moderate temperature (e.g. well below the annealing temperature of aluminum, which is about 355° C.). The resulting coating has low surface energy, is resistant to abrasion and is quite hard. Polytetrafluoroethylene, on the other hand, requires a high baking temperature (e.g. about 370° C.) and the resulting coating is very soft.

In the preparation of the R$_f$PPO–PArS blends of the invention, a small amount of a more volatile solvent such as acetone, may or may not be added. The final solution can be adjusted to 15–20% polymer solids depending on the viscosity of the polymer. A small amount (e.g. 0.5 to 5.0%) of an adhesion promoter, such as a polyacid amide or an epoxy resin, may also be added to improve adhesion of the coating to substrates.

What is claimed is:

1. A thermoplastic, substantially linear, fluoroaliphatic-substituted poly-(phenylene oxide) having an inherent viscosity measured from a 1% solution of the polymer in chloroform of at least 0.05 and a number average molecular weight of at least 1500, from about 20% to 65% by weight of the polymer being contributed by fluorine atoms in fluoroaliphatic side groups which occur as substituents on the aromatic nuclei therein.

2. A polymer according to claim 1 wherein the fluoroaliphatic side groups are perfluoroalkyl groups.

3. A thermoplastic, substantially linear, fluoroaliphatic-substituted poly-(para-phenylene oxide) according to claim 2.

4. A thermoplastic, substantially linear, fluoroaliphatic-substituted poly-(phenylene oxide) according to claim 2 containing from about 35 to 40% ortho-phenylene oxide units, the remainder being para-phenylene oxide units.

5. A blend of from about 2 to 50 parts of a thermoplastic, fluoroaliphatic-substituted poly-(phenylene oxide) according to claim 2 and from about 98 to 50 parts of a thermoplastic, substantially linear polyarylsulfone, from about 1 to 25 percent by weight of the blend being contributed by fluorine atoms in fluoroaliphatic side groups which occur as substituents on the aromatic nuclei of the poly-(phenylene oxide).

6. A blend of from about 2 to 50 parts of a thermoplastic, substantially linear fluoroaliphatic-substituted poly-(phenylene oxide) according to claim 2 and from about 98 to 50 parts of a thermoplastic, substantially linear polyarylsulfone wherein the polyarylsulfone has recurring aromatic sulfone units of the formula:

wherein each Z is an organic group containing not more than about 18 carbon atoms which is aromatically bonded to both of its valences, from about 1 to 25 weight percent of the blend being contributed by fluorine atoms in fluoroaliphatic side groups.

7. A blend according to claim 5 wherein the polyarylsulfone is a copolymer consisting essentially of divalent biphenyl and diphenyl ether moieties connected by sulfone groups, the ratio of diphenyl ether to biphenyl moieties being from 4:6 to 3:7.

8. A blend according to claim 7 wherein the polyarylsulfone is a copolymer consisting essentially of divalent biphenyl and diphenyl ether moieties connected by sulfone groups, the ratio of diphenyl ether to biphenyl moieties being about 1:2.

9. An article coated with a thermoplastic fluoroaliphatic-substituted poly-(phenylene oxide) according to claim 2.

10. An article coated with thermoplastic, substantially linear fluoroaliphatic-substituted poly-(para-phenylene oxide) according to claim 4.

11. An article coated with the blend of claim 6.

12. An article according to claim 11 wherein the polyarylsulfone is a copolymer consisting essentially of divalent biphenyl and diphenyl ether moieties connected by sulfone groups, the ratio of diphenyl ether to biphenyl moieties being about 1:2.

References Cited

UNITED STATES PATENTS 3,375,297  3/1968  Barth et al. _____ 260—823

FOREIGN PATENTS 1,384,255  12/1965  France.

MURRAY TILLMAN, Primary Examiner

M. J. TULLY, Assistant Examiner

U.S. Cl. X.R.

117—132, 138.8, 148, 155, 161, 124, 126; 161—192; 260—30.2, 33.6, 37, 47, 49